K. STEINBECKER.
INTERNAL COMBUSTION ENGINE.
APPLICATION FILED MAR. 9, 1912.
1,050,087.
Patented Jan. 7, 1913.
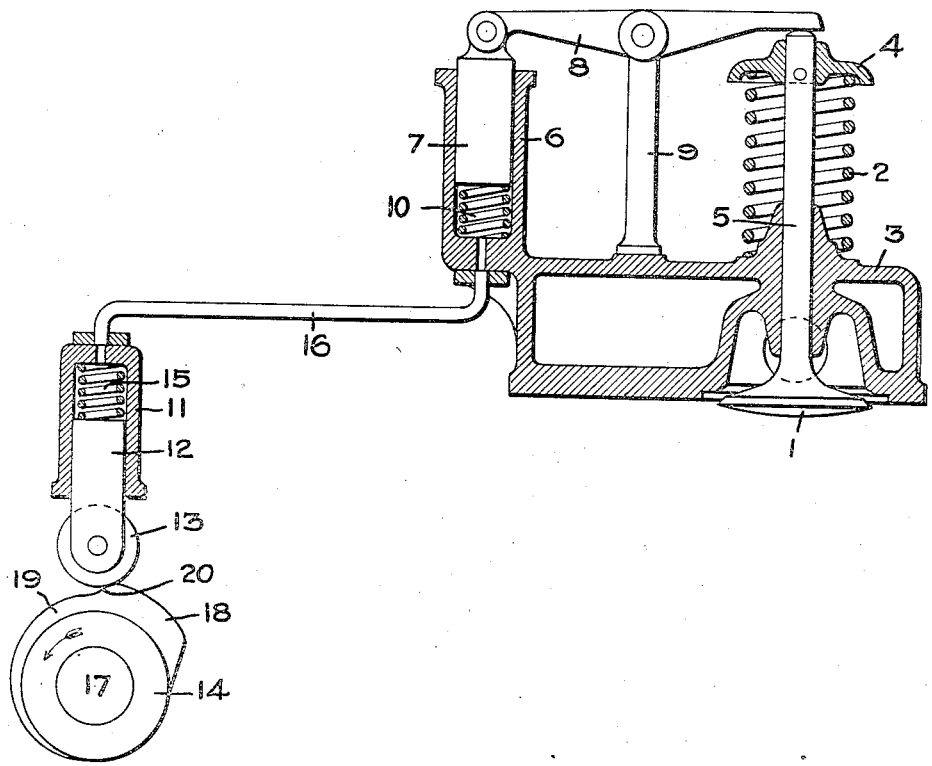
WITNESSES:
INVENTOR:
KARL STEINBECKER
BY
HIS ATTORNEY.

UNITED STATES PATENT OFFICE.

KARL STEINBECKER, OF CHARLOTTENBURG, GERMANY, ASSIGNOR TO GENERAL ELECTRIC COMPANY, A CORPORATION OF NEW YORK.

INTERNAL-COMBUSTION ENGINE.

1,050,087. Specification of Letters Patent. Patented Jan. 7, 1913.

Application filed March 9, 1912. Serial No. 682,607.

*To all whom it may concern:*

Be it known that I, KARL STEINBECKER, a subject of the King of Prussia, residing at Charlottenburg, Germany, have invented certain new and useful Improvements in Internal-Combustion Engines, of which the following is a specification.

The present invention relates to internal combustion engines and specifically to the means employed to transmit motion from the way or half speed shaft to the valve controlling the admission of fuel to the engine cylinder or the exhaust therefrom, or to both admission and exhaust valves.

In carrying out my invention a fluid column is interposed between the cam shaft and the valve or valves to be actuated. It is not broadly new to utilize a fluid column to transmit motion from one part to another but in said arrangements the fact has been overlooked or neglected that the fluid forming the column is more or less compressible due chiefly to the presence of air in the confined space with said column. Owing to this compressibility a retardation in the effective action of the apparatus has heretofore taken place. For many purposes such retardation is of no practical importance but in internal combustion engines where the opening and closing of the valves must be timed or regulated with great exactness it becomes of the greatest importance, especially where their speed is controlled by fluid under pressure.

I avoid the lag or retardation in the operation of the valves by subjecting the fluid column to a preliminary pressure or compression just prior to the time that the valve or valves is or are to be actuated. After the preliminary compression takes place it is followed by the final compression. The preliminary compression should be sufficient to render the column as solid as possible but should not be great enough to open the valve since otherwise the advantages of my improved arrangement would be lost. The final compression should be of such character and amount as to quickly and fully open the valve or valves by the desired amount and within the predetermined limit of time.

I have shown in the accompanying drawing a suitable mechanism for carrying out my invention in one of its embodiments, said drawing showing an inlet valve for an engine and its actuator in section.

1 indicates a valve that for example may be the inlet valve of an internal combustion engine. The valve is normally held against its seat by an external compression spring 2, one end of which rests on top of the cylinder head 3 or other fixed part of the engine. The upper end of the spring engages a head 4 that is pinned or otherwise secured to the valve stem 5. Situated at one side of the valve is a small cylinder 6 containing a piston 7 which is pivotally attached to the lever 8. The lever is pivotally supported by a post 9 and its right-hand end rests on the valve stem 5 or other part of the valve. As the lever is tilted on its pivot in a clockwise direction by the piston it opens the valve 1 and also compresses the spring 2 to a greater degree. As soon as the fluid pressure under the piston is relieved the compression spring seats the valve. Under the piston is a small compression spring 10 that serves to hold the lever in contact with the valve stem and thus take up any lost motion of the parts.

11 indicates a second cylinder or container having a piston 12, the latter carrying a roller 13 which rolls on the cam 14 to be described later. Located above the piston 12 is a small compression spring 15 that serves at all times to hold the roller 13 in engagement with the cam and thus prevent lost motion at this point. The cylinders are connected by a small pipe 16 which may be of any suitable length and shape, thereby permitting the cam 14 and its shaft to be located at the most convenient point with respect to the main engine shaft from which it receives motion. The cylinder spaces at the inner ends of the pistons and also the pipe 16 are filled with some liquid, such as oil for example. The pistons may be packed in any well known manner if desired. Suitable means may also be provided for filling the parts with liquid and keeping a constant amount therein.

17 indicates a cam shaft or other motive power agent driven by any suitable means and mounted thereon is the cam 14 above referred to. The shaft 17 is the one commonly referred to as the way or half speed shaft, meaning thereby that is is driven by the main engine shaft and at one half its speed. The parts are so arranged that the valve 1 is opened once for every revolution of the cam shaft or every two revolutions of the engine shaft. For this purpose the cam is provided with a portion 18 which as the roller travels thereon causes the piston 12 to force fluid from its cylinder space into the cylinder space of the piston 7 and the latter acting through the lever 8 opens the valve. The said cam 18 acts to impart the final pressure to the fluid column and hence the pressure which opens the valve 1.

In order to overcome the effects of retardation due to compressibility of the fluid column used as a transmitting medium, in other words to impart thereto a preliminary compression, a second cam 19 is provided that is carried by the cam shaft 17 and is located in the same plane as the main cam 18 so as to act on the roller 13. This cam starts at some point concentric with the body of the main cam 18 and gradually increases in diameter to a point adjacent the active part of said cam. The increase in diameter should be such as to cause the fluid in the cylinders and pipe 16 to be fully compressed without, however, causing the valve 1 to open. Between the primary and main cams is a connecting portion 20 which in reality is a part of the main cam so that the roller 13 can pass freely from one to the other. It will be noted that the primary cam causes a relatively slow movement of the piston 12 while the cam 18 causes a sudden movement. The cam 18 should be of such character as to insure the proper opening of the inlet valve 1 at the right time. By reason of the preliminary compression of the fluid due to the cam 19 the cam 18 will fully and completely open the valve 1 without the retardation or lag which would otherwise take place and which would be highly objectionable in apparatus of the character described.

In the operation of my improved mechanism the fluid column is given a preliminary compression as well as a final compression for each complete rotation of the cam shaft. Obviously the cam shaft may be rotated at any desired speed to suit the character or type of engine. I have omitted the engine details since they seem unnecessary to an understanding of the invention.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a device to be actuated, a motive power agent, a means having a column of liquid for transmitting movements of the agent to the device, a forcing means actuated by the agent for imparting a preliminary pressure to the fluid column, and a means also driven by said agent for actuating the forcing means to impart a final pressure to the fluid column.

2. In combination, a device to be actuated, a container having a liquid column, a cam for imparting a preliminary compression to the column to reduce retardation in the action of the main cam on the device, and a main cam for imparting final pressure to the liquid and causing it to operate the device.

3. In combination, a valve, a fluid actuated device for operating the valve, a means for conveying fluid under pressure to the device, a cam for imparting a preliminary compression to the fluid in said means, and a cam for imparting a final pressure to the fluid which is sufficient to cause said device to operate the valve.

4. In combination, an engine valve, a fluid actuated motor, a means moved by the motor for actuating the valve, a fluid container that is piped to the motor, a forcing means driven by the engine for imparting a preliminary compression to the fluid in the container and motor, and a second means also driven by the engine for actuating the forcing means to impart a final pressure to said fluid to cause the motor to actuate the valve.

5. In combination, an engine, a fluid actuated motor, a means moved by the motor for actuating the valve, a fluid container that is piped to the motor, a forcing means actuated by the engine for imparting a preliminary compression to the fluid in the container and motor, and a second means also actuated by the engine for causing the forcing means to impart a final pressure to said fluid to cause the motor to open the valve, and a spring to close the valve.

6. In combination, a valve, a fluid actuated motor, a means moved by the motor for actuating the valve, a spring for preventing lost motion between the means and the valve, a fluid container that is piped to the motor, a means for imparting a preliminary pressure to the fluid in the container and motor, a second means for imparting a final pressure to the fluid in the container, and a spring for preventing lost motion between the two pressure imparting means and the fluid container.

7. In an internal combustion engine, the combination of a valve, a spring that tends to hold the valve closed, a fluid actuated device for opening the valve, means for conveying fluid under pressure to said device, a preliminary means for imparting pressure to the fluid in said conveying means, and cam mechanism which actuates the means and gradually imparts a pressure to the fluid that is approximately equal and opposite to the force of the spring, and then quickly imparts a further pressure to the fluid in the same direction to open the valve.

In witness whereof, I have hereunto set my hand this twenty-first day of February, 1912.

KARL STEINBECKER.

Witnesses:
 HENRY HASPER,
 WOLDEMAR HAUPT.